(12) United States Patent
Machino et al.

(10) Patent No.: US 10,906,183 B2
(45) Date of Patent: Feb. 2, 2021

(54) CALIBRATION SYSTEM

(71) Applicants: Toyota Jidosha Kabushiki Kaisha, Toyota (JP); Tamadic Co., Ltd., Tokyo (JP); Shinya Hirano, Nisshin (JP)

(72) Inventors: Motoyasu Machino, Nisshin (JP); Kazuki Yokouchi, Miyoshi (JP); Masato Inagaki, Toyota (JP); Shinya Hirano, Nisshin (JP)

(73) Assignees: Toyota Jidosha Kabushiki Kaisha, Toyota (JP); Tamadic Co., Ltd., Tokyo (JP); Shinya Hirano, Nisshin (JP)

( * ) Notice: Subject to any disclaimer, the term of this patent is extended or adjusted under 35 U.S.C. 154(b) by 365 days.

(21) Appl. No.: 15/954,092

(22) Filed: Apr. 16, 2018

(65) Prior Publication Data

US 2018/0304466 A1   Oct. 25, 2018

(30) Foreign Application Priority Data

Apr. 19, 2017 (JP) .................................. 2017-083029

(51) Int. Cl.
*G06F 17/00* (2019.01)
*B25J 9/16* (2006.01)
*B25J 9/00* (2006.01)

(52) U.S. Cl.
CPC ........... *B25J 9/1692* (2013.01); *B25J 9/0087* (2013.01); *B25J 9/1682* (2013.01); *B25J 9/1697* (2013.01);

(Continued)

(58) Field of Classification Search
CPC ...... B25J 9/1692; B25J 9/0087; B25J 9/1682; B25J 9/1697; G05B 2219/39045; G05B 2219/39051; Y10S 901/09; Y10S 901/47

(Continued)

(56) References Cited

U.S. PATENT DOCUMENTS 4,639,878 A * 1/1987 Day ..................... G01B 11/002
                                                              348/94
4,983,797 A * 1/1991 McAllister ......... B23K 26/0823
                                                              219/121.64

(Continued)

FOREIGN PATENT DOCUMENTS

DE           69105476 T2     4/1995
DE           69113024 T2     2/1996

(Continued)

*Primary Examiner* — Ronnie M Mancho
(74) *Attorney, Agent, or Firm* — Dinsmore & Shohl LLP

(57) ABSTRACT

A calibration system that calibrates robots installed in a process includes: a reference measuring element; a flange measuring element attached to a flange provided at an arm tip of each robot; a fixed measuring device configured to measure the flange measuring element of each robot and the reference measuring element; and a controller configured to control the robots, calculate a position and attitude relation between the flange measuring element of each robot and the reference measuring element based on a measured result measured by the fixed measuring device, and calculate an error between a design installation position and attitude of each robot and an actual installation position and attitude of the robot by using the measured position and attitude relation and position and attitude data of the flange measuring element in a robot coordinate system at the time when the robot has been measured by the fixed measuring device.

9 Claims, 12 Drawing Sheets

(52) U.S. Cl.
CPC ............. *G05B 2219/39045* (2013.01); *G05B 2219/39051* (2013.01); *Y10S 901/09* (2013.01); *Y10S 901/47* (2013.01)

(58) Field of Classification Search
USPC ........................................................ 700/248
See application file for complete search history.

(56) References Cited

U.S. PATENT DOCUMENTS

| | | | |
|---|---|---|---|
| 5,020,001 A * | 5/1991 | Yamamoto | G05B 19/4086 700/189 |
| 5,086,262 A * | 2/1992 | Hariki | B25J 9/1682 318/562 |
| 5,148,591 A * | 9/1992 | Pryor | A01B 69/008 29/407.04 |
| 5,333,242 A | 7/1994 | Watanabe et al. | |
| 6,114,824 A | 9/2000 | Watanabe | |
| 7,200,260 B1 * | 4/2007 | Watanabe | B25J 9/1692 382/103 |
| 7,783,443 B2 * | 8/2010 | Aratani | G06T 7/80 702/94 |
| 8,688,274 B2 * | 4/2014 | Shieh | B25J 9/1692 700/245 |
| 8,923,602 B2 * | 12/2014 | Melikian | B25J 9/1697 382/153 |
| 9,855,655 B2 * | 1/2018 | Inutake | G05B 19/4182 |
| 2003/0078694 A1 | 4/2003 | Watanabe et al. | |
| 2010/0168915 A1 | 7/2010 | Kagawa et al. | |
| 2011/0066393 A1 | 3/2011 | Groll et al. | |

FOREIGN PATENT DOCUMENTS

| | | |
|---|---|---|
| DE | 60127644 T2 | 7/2007 |
| DE | 102006004153 A1 | 8/2007 |
| DE | 102009041734 A1 | 3/2011 |
| JP | H05016083 A | 1/1993 |
| JP | 2010142901 A | 7/2010 |

* cited by examiner

CALIBRATION SYSTEM

CROSS-REFERENCE TO RELATED APPLICATIONS

This application claims priority to Japanese Patent Application No. 2017-083029 filed on Apr. 19, 2017, the entire contents of which are incorporated herein by reference.

BACKGROUND

1. Technical Field

The disclosure relates to a calibration system for robots.

2. Description of Related Art

A calibration system that calibrates a robot is known (see, for example, Japanese Unexamined Patent Application Publication No. 5-016083 (JP 5-016083 A)).

In the technique described in JP 5-016083 A, a calibration system for a robot having a plurality of arm axes configured to move the tip of an arm and a plurality of wrist axes configured to move the tip of a wrist provided at the arm tip computes deviations between driven positions of the arm axes at the time when the arm tip has been positioned at a first reference position by driving the arm axes and first driven positions stored in a storage unit, and corrects origins of the arm axes based on the computed deviations. In addition, the calibration system computes deviations between driven positions of the wrist axes at the time when the wrist tip has been positioned at a second reference position and second driven positions stored in the storage unit, and corrects origins of the wrist axes based on the computed deviations.

SUMMARY

Incidentally, since the technique described in JP 5-016083 A is a technique for calibrating a single robot, when a plurality of robots is installed in a process, such as a process of working equipment, each of the robots needs to be calibrated off-line individually. For this reason, calibration of all the robots in the process takes much time.

The disclosure has been made in consideration of such a situation, and provides a calibration system that is able to shorten a time that is required to calibrate a plurality of robots installed in a process.

An aspect of the disclosure provides a calibration system that calibrates a plurality of robots installed in a process. The calibration system includes a reference measuring element, a flange measuring element, a fixed measuring device, and a controller. The reference measuring element is installed in the process. The reference measuring element has three or more first measuring points that are not aligned in a straight line. A distance between any two of the three or more first measuring points is predetermined. The flange measuring element is attached to a flange provided at an arm tip of each of the robots. The flange measuring element has three or more second measuring points that are not aligned in a straight line. A distance between any two of the three or more second measuring points is predetermined. The fixed measuring device is installed in the process. The fixed measuring device is configured to measure the flange measuring element of each of the robots and the reference measuring element. The controller is configured to control the robots.

The controller is configured to calculate a position and attitude relation between the flange measuring element of each robot and the reference measuring element based on a measured result measured by the fixed measuring device. The controller is configured to calculate an error between a design installation position and attitude of each robot and an actual installation position and attitude of the robot (hereinafter, also simply referred to as robot error) by using a calculation result of the position and attitude relation between the flange measuring element of each robot and the reference measuring element and position and attitude data of the flange measuring element in a robot coordinate system at the time when the robot has been measured by the fixed measuring device.

The position and attitude in the aspect of the disclosure means positions in three axes, that is, a position in an X axis, a position in a Y axis and a position in a Z axis, and an attitude around the X axis, an attitude around the Y axis and an attitude around the Z axis. The robot coordinate system means a coordinate system of which an origin is a reference point of a base of the robot.

The error between a design installation position and attitude of each robot and an actual installation position and attitude of the robot in the aspect of the disclosure means an error including an installation error of the robot and a machine difference of the robot. The machine difference means an error including a working error, manufacturing error and assembling error of the robot.

According to the aspect of the disclosure, the flange measuring element of each of the robots installed in the process and the reference measuring element are measured by the fixed measuring device and then a robot error of each robot is calculated by the controller by using the measured result, so it is possible to calibrate the plurality of robots installed in the process on-line. Thus, in comparison with the case where a plurality of robots is individually calibrated, a time that is required for calibration is shortened, so it is possible to shorten the overall calibration time of a process, such as a process of working equipment.

In the aspect of the disclosure, the controller may be configured to calculate the actual installation position and attitude of each robot by using the calculated error between the design installation position and attitude of the robot and the actual installation position and attitude of the robot as a correction amount. By executing such calculation, the actual installation position and attitude of a representative point (for example, the center of a flange tip surface) of the flange of each robot is adjusted to the design installation position and attitude.

In the aspect of the disclosure, the calibration system may further include a robot hand measuring device attached to the flange of a specified one of the robots. The robot hand measuring device of the specified one of the robots may be configured to measure the reference measuring element. The controller may be configured to calculate a position and attitude relation between a measuring tool point of the robot hand measuring device and the reference measuring element based on a measured result measured by the robot hand measuring device of the specified one of the robots. The controller may be configured to calculate an error between a design installation position and attitude of the measuring tool point of the robot hand measuring device of the specified one of the robots and an actual installation position and attitude of the measuring tool point (hereinafter, also referred to as a robot hand measuring device error of the specified one of the robots) by using a calculation result of the position and attitude relation between the measuring tool point of the robot hand measuring device and the reference measuring element, position and attitude data of the measuring tool point of the robot hand measuring device in the robot coordinate system at the time when measurement has been performed by the robot hand measuring device, and the calculated error between the design installation position and attitude of the specified one of the robots and the actual installation position and attitude of the specified one of the robots.

With this configuration, the robot hand measuring device error of the specified one of the robots is calculated by using a measured result of the reference measuring element, measured by the robot hand measuring device of the specified one of the robots, position and attitude data of the design measuring tool point in the robot coordinate system, and the calculated robot error of the specified one of the robots, so it is possible to easily calibrate the installation position and attitude of the robot hand measuring device of the specified one of the robots in a short time.

In this configuration, the controller may be configured to calculate the actual installation position and attitude of the measuring tool point of the robot hand measuring device by using the calculated error between the design installation position and attitude of the measuring tool point of the robot hand measuring device of the specified one of the robots and the actual installation position and attitude of the measuring tool point as a correction amount. By executing such calculation, the actual installation position and attitude of the measuring tool point of the robot hand measuring device of the specified one of the robots is adjusted to the design installation position and attitude.

The error between the design installation position and attitude of the measuring tool point of the robot hand measuring device and the actual installation position and attitude means an error including an installation error of the robot hand measuring device and a machine difference of the robot hand measuring device. The machine difference of the robot hand measuring device means an error including a working error, manufacturing error and assembling error of the robot hand measuring device.

In the aspect of the disclosure, the calibration system may further include a working tool attached to the flange of a specified one of the robots, and the fixed measuring device may be configured to measure the working tool of the specified one of the robots and the reference measuring element. The controller may be configured to calculate a position and attitude relation between a working tool point of the working tool of the specified one of the robots and the reference measuring element based on a measured result measured by the fixed measuring device. The controller may be configured to calculate an error between a design installation position and attitude of the working tool point of the working tool of the specified one of the robots and an actual installation position and attitude of the working tool point (hereinafter, also referred to as a working tool error of the specified one of the robots) by using a calculation result of the position and attitude relation between the working tool point of the working tool of the specified one of the robots and the reference measuring element, position and attitude data of the design working tool point of the working tool in the robot coordinate system at the time when measurement has been performed by the fixed measuring device, and the calculated error between the design installation position and attitude of the specified one of the robots and the actual installation position and attitude of the specified one of the robots.

With this configuration, the working tool error of the specified one of the robots is calculated by using a measured result of the working tool of the specified one of the robots and the reference measuring element, measured by the fixed measuring device, position and attitude data of the design working tool point in the robot coordinate system, and the calculated robot error of the specified one of the robots, so it is possible to easily calibrate the installation position and attitude of the working tool of the specified one of the robots in a short time.

In this configuration, the controller may be configured to calculate the actual installation position and attitude of the working tool point of the working tool of the specified one of the robots by using the calculated error between the design installation position and attitude of the working tool point of the working tool of the specified one of the robots and the actual installation position and attitude of the working tool point as a correction amount. By executing such calculation, the actual installation position and attitude of the working tool point of the working tool of the specified one of the robots is adjusted to the design installation position and attitude.

The error between the design installation position and attitude of the working tool point of the working tool of the specified one of the robots and the actual installation position and attitude means an error including an installation error of the working tool of the specified one of the robots and a machine difference of the working tool. The machine difference of the working tool of the specified one of the robots means an error including a working error, manufacturing error and assembling error of the working tool of the specified one of the robots.

In the aspect of the disclosure, the calibration system may further include a robot hand measuring device attached to the flange of a specified one of the robots; and a working tool attached to the flange of another one of the robots, other than the specified one of the robots, and the robot hand measuring device of the specified one of the robots may be configured to measure the working tool of the another one of the robots. The controller may be configured to calculate a position and attitude relation between a measuring tool point of the robot hand measuring device and a working tool point of the working tool of the another one of the robots based on a measured result measured by the robot hand measuring device of the specified one of the robots. The controller may be configured to calculate an error between a design installation position and attitude of the working tool point of the working tool of the another one of the robots and an actual installation position and attitude of the working tool point (hereinafter, also referred to as a working tool error of the another one of the robots) by using a calculation result of the position and attitude relation between the measuring tool point of the robot hand measuring device and the working tool point of the working tool of the another one of the robots, position and attitude data of the measuring tool point of the robot hand measuring device in the robot coordinate system at the time when measurement has been performed by the robot hand measuring device, the calculated error between the design installation position and attitude of the specified one of the robots and the actual installation position and attitude of the specified one of the robots, and the calculated error between the design installation position and attitude of the another one of the robots and the actual installation position and attitude of the another one of the robots.

With this configuration, the working tool error of the another one of the robots is calculated by using a measured result of the working tool of the another one of the robots, measured by the robot hand measuring device of the specified one of the robots, position and attitude data of the measuring tool point in the robot coordinate system, the calculated robot error of the specified one of the robots and the calculated robot error of the another one of the robots, so it is possible to easily calibrate the installation position and attitude of the working tool of the another one of the robots in a short time.

In this configuration, the controller may be configured to calculate the actual installation position and attitude of the working tool point of the working tool of the another one of the robots by using the calculated error between the design installation position and attitude of the working tool point of the working tool of the another One of the robots and the actual installation position and attitude of the working tool point as a correction amount. By executing such calculation, the actual installation position and attitude of the working tool point of the working tool of the another one of the robots is adjusted to the design installation position and attitude.

The error between the design installation position and attitude of the working tool point of the working tool of the another one of the robots and the actual installation position and attitude means an error including an installation error of the working tool of the another one of the robots and a machine difference of the working tool. The machine difference of the working tool of the another one of the robots means an error including a working error, manufacturing error and assembling error of the working tool of the another one of the robots.

According to the aspect of the disclosure, it is possible to shorten a time that is required to calibrate a plurality of robots installed in a process.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawing.

In the present embodiment, the case where two six-axis articulated robots are installed in a process are calibrated will be described.

Initially, in the present embodiment, six variables are a variable in an X axis, a variable in a Y axis, a variable in a Z axis, a variable around the X axis, a variable around the Y axis and a variable around the Z axis. The X axis and the Y axis are orthogonal to each other in a horizontal plane. The Z axis is positive vertically upward. As described above, a position and attitude means positions in the three axes, that is, a position in the X axis, a position in the Y axis and a position in the Z axis, and an attitude around the X axis, an attitude around the Y axis and an attitude around the Z axis.

Figure 1:
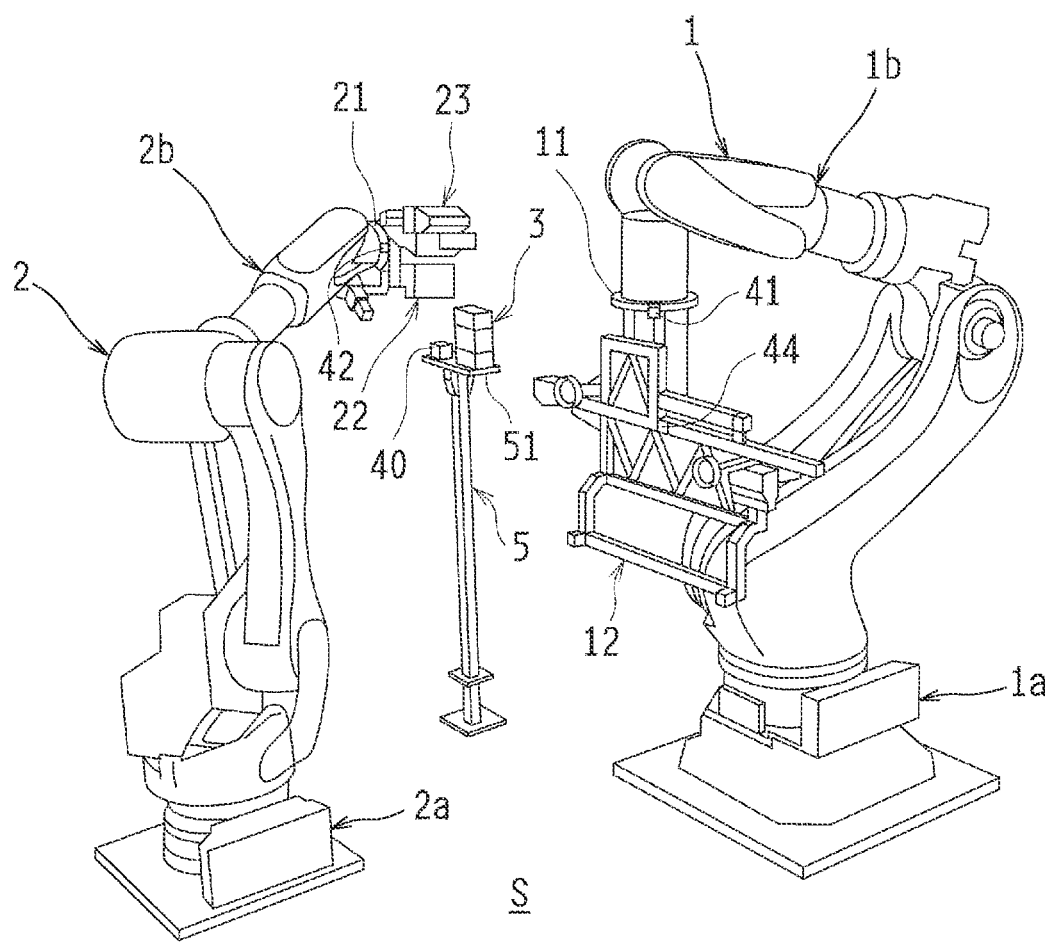
FIG. 1 is a perspective view that shows the schematic configuration of first and second robots installed in a process of working equipment.

In the present embodiment, as shown in FIG. 1, two robots, that is, a first robot 1 and a second robot 2, are installed in a process S of working equipment (hereinafter, also simply referred to as process S). Each of the first robot 1 and the second robot 2 is a six-axis articulated robot. Motions of these first robot 1 and second robot 2 are controlled by a controller 100 (see FIG. 2). The second robot 2 is an example of a specified one of robots according to the aspect of the disclosure. The first robot 1 is an example of another one of robots according to the aspect of the disclosure.

The first robot 1 includes an articulated robot arm 1b provided on a base 1a. A flange 11 is provided at a tip of the robot arm 1b. A working tool, or the like, is attached to the flange 11. A material hand 12 is attached to the flange 11 of the first robot 1. The material hand 12 is a tool that holds, for example, a door of a vehicle. The material hand 12 is an example of a working tool attached to a flange of another one of robots according to the aspect of the disclosure.

The second robot 2 includes an articulated robot arm 2b provided on a base 2a. A flange 21 is provided at a tip of the robot arm 2b. A working tool, or the like, is attached to the flange 21. A robot hand measuring device 22 and a nut runner 23 are attached to the flange 21 of the second robot 2. The robot hand measuring device 22 is, for example, a laser displacement gauge. Hereinafter, the robot hand measuring device 22 is referred to as robot camera 22. The nut runner 23 is a tightener that tightens a nut to a workpiece (for example, a door of a vehicle). The nut runner 23 is an example of a working tool attached to a flange of a specified one of robots according to the aspect of the disclosure.

A support post 5 is installed at a predetermined position in the process S. A support base 51 is provided on a top of the support post 5. A fixed measuring device 3 and a measuring element 4 (40) are installed on the support base 51. The fixed measuring device 3 is, for example, a laser displacement gauge. Hereinafter, the fixed measuring device 3 is referred to as fixed camera 3.

Figure 3:
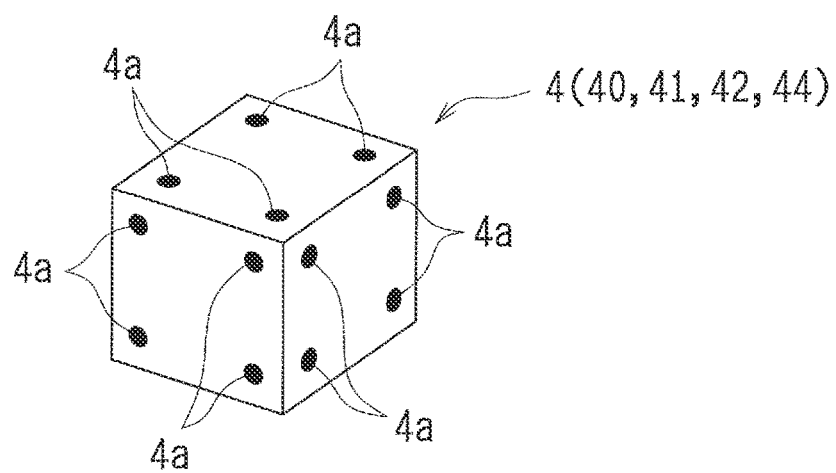
FIG. 3 is a perspective view that shows the structure of a measuring element.

The measuring element 4 has a regular hexahedral shape (for example, made of a metal) as shown in FIG. 3. Four measuring points 4a are provided on each of a plurality of sides (for example, five sides other than a mounting side to the support base 51, the flange 11 (described later) or the flange 21 (described later)) of the regular hexahedral shape in the measuring element 4. These four measuring points 4a are recesses (concaves) arranged at positions corresponding to the vertices of a square. A distance between any two of the measuring points 4a on each side is known. Hereinafter, the measuring element 4, installed at the predetermined position in the process S, is referred to as reference measuring element 40. The reference measuring element 40 is a position and attitude reference in the process S. The reference measuring element 40 is fixedly disposed such that one side faces the fixed camera 3.

The measuring element 4 shown in FIG. 3 is attached to the flange 11 of the first robot 1. Hereinafter, the measuring element 4 attached to the flange 11 of the first robot 1 is referred to as flange measuring element 41. The flange measuring element 41 is positioned relatively with respect to the flange 11 of the first robot 1. A position and attitude relation between a representative point (for example, the center of a flange tip surface) of the flange 11 and the four measuring points 4a on each side of the flange measuring element 41 is known.

The measuring element 4 shown in FIG. 3 is also attached to the flange 21 of the second robot 2. Hereinafter, the measuring element 4 attached to the flange 21 of the second robot 2 is referred to as flange measuring element 42. The flange measuring element 42 is positioned relatively with respect to the flange 21 of the second robot 2. A position and attitude relation between a representative point (for example, the center of a flange tip surface) of the flange 21 of the second robot 2 and the four measuring points 4a on each side of the flange measuring element 42 is known.

Controller

Next, the controller 100 will be described.

Figure 2:
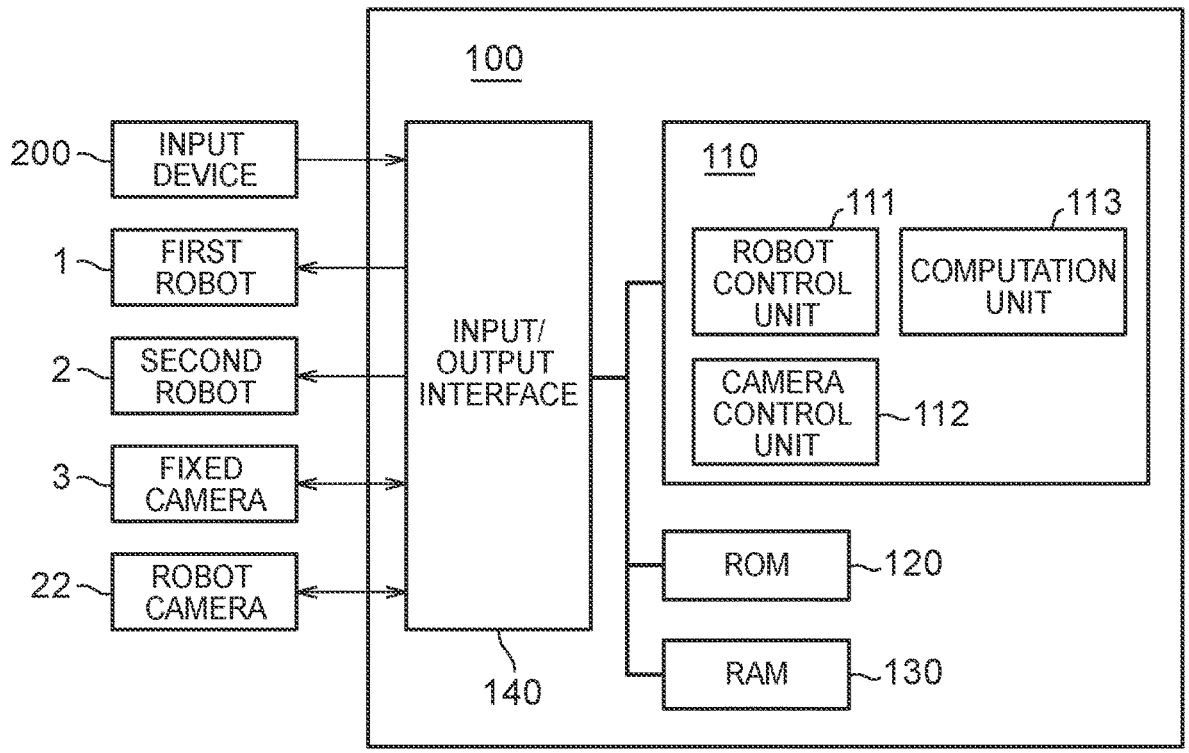
FIG. 2 is a block diagram that shows the configuration of a controller.

As shown in FIG. 2, the controller 100 includes a central processing unit (CPU) 110, a read only memory (ROM) 120, a random access memory (RAM) 130, an input/output interface 140, and the like. The ROM 120 stores programs for controlling various units. The RAM 130 temporarily stores data.

The CPU 110 is configured to execute arithmetic processing based on programs, data, and the like, stored in the ROM 120. Programs, data, and the like, for control are stored in the ROM 120. The RAM 130 temporarily stores processed results, or the like, of the CPU 110. The first robot 1, the second robot 2, the fixed camera 3, the robot camera 22 and an input device 200 are connected to the input/output interface 140.

The CPU 110 includes a robot control unit 111, a camera control unit 112 and a computation unit 113.

The robot control unit 111 actuates the first robot 1 and the second robot 2 in accordance with a motion command from the input device 200 or a motion program, and moves the flange 11 of the first robot 1 and the flange 21 of the second robot 2.

During calibration, the robot control unit 111 actuates the first robot 1 and the second robot 2 in accordance with, for example, a motion command from the input device 200, and moves the flange 11 of the first robot 1 and the flange 21 of the second robot 2. Furthermore, during calibration, the robot control unit 111 transmits, to the computation unit 113, data of the six variables of each of the first robot 1 and the second robot 2 at the time when the first robot 1 and the second robot 2 have been actuated.

The camera control unit 112 drives the fixed camera 3 and the robot camera 22 in accordance with a motion command from the input device 200. The camera control unit 112 transmits, to the computation unit 113, camera measured data measured by the fixed camera 3 and camera measured data measured by the robot camera 22.

The computation unit 113 executes robot calibration, robot camera calibration, nut runner calibration, material hand calibration, and the like (described later), based on the data of the six variables from the robot control unit 111 and the camera measured data from the camera control unit 112.

Robot Calibration

Next, calibration of the two robots, that is, the first robot 1 and the second robot 2, installed in the process S will be described with reference to FIG. 1 and FIG. 4 to FIG. 7.

Definition of Mathematical Expression in Specification

Initially, in the specification, in order to express the positions and attitudes of six variables, a three-dimensional coordinate system is used, and a relative position and attitude between two coordinate systems is expressed by a homogeneous transformation matrix. In the specification, a homogeneous transformation matrix with four rows and four columns, representing coordinate transformation from a coordinate system A to a coordinate system B, is denoted by $^{A}T_{B}$.

Robot Operation and Measurement During Robot Calibration

First Robot 1

Figure 4:
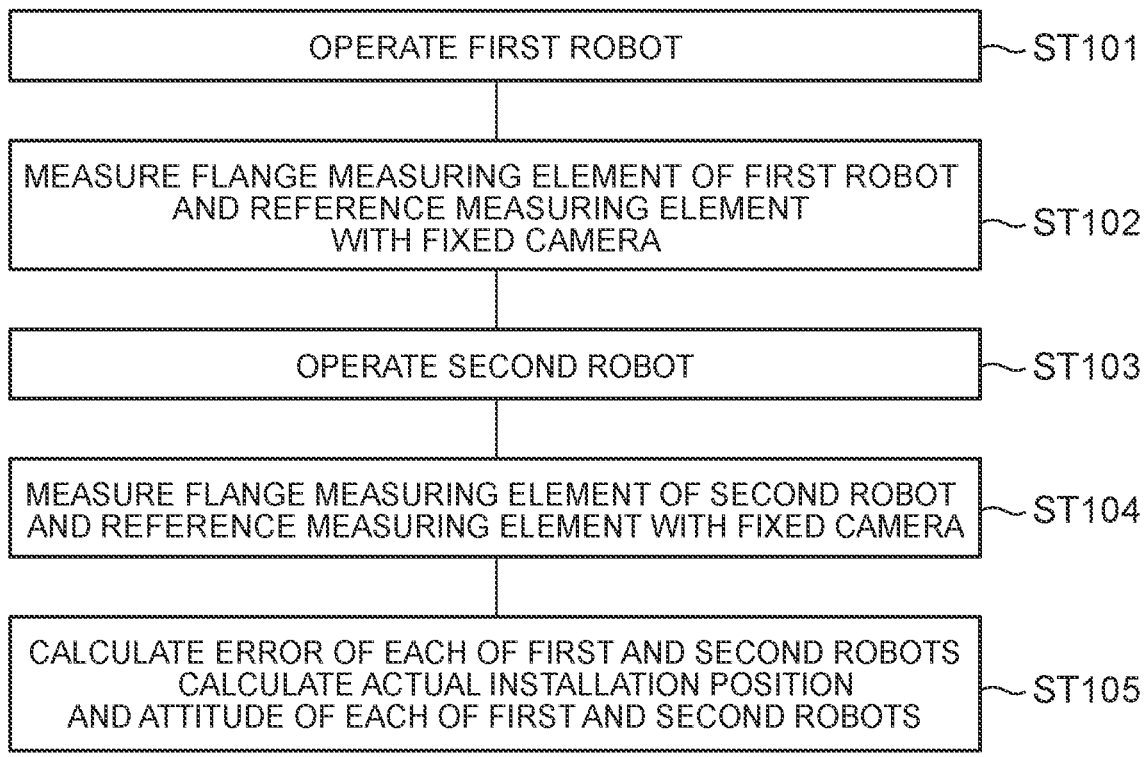
FIG. 4 is a flowchart that shows the process details of calibration of the first robot and the second robot.
Figure 5:
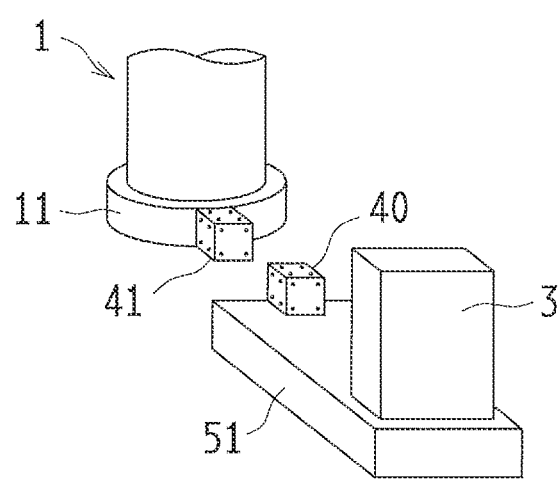
FIG. 5 is a view that schematically shows a state where a measuring element on a flange of the first robot and a reference measuring element are measured by a fixed camera.

Initially, by actuating the first robot 1 to move the flange 11 of the first robot 1, the flange 11 of the first robot 1 is placed near the reference measuring element 40 as shown in the schematic view of FIG. 5, and one side of the flange measuring element 41 attached to the flange 11 is faced toward the fixed camera 3 (step ST101 of FIG. 4). In this state, the four measuring points 4a of the reference measuring element 40 and the four measuring points 4a of the flange measuring element 41 are measured by driving the fixed camera 3 (step ST102 of FIG. 4).

By measuring the four measuring points 4a of the reference measuring element 40 and the four measuring points 4a of the flange measuring element 41 with the fixed camera 3 in this way, a position and attitude relation (a relation in the position in the X axis, the position in the Y axis and the position in the Z axis and a relation in the attitude around the X axis, the attitude around the Y axis and the attitude around the Z axis) between the reference measuring element 40 and the flange measuring element 41 is obtained from the camera measured data. Calculation for obtaining the position and attitude relation between the reference measuring element 40 and the flange measuring element 41 from the camera measured data is executed in the computation unit 113.

As for the measuring points that the fixed camera 3 (including the robot camera 22) measures, measurement of the above-described six variables is possible as long as three measuring points are obtained, a distance between any two of the three measuring points is known and the three measuring points are not aligned in the same line. In the present embodiment, since the four measuring points 4a are provided on each of the sides of the reference measuring element 40 and each of the sides of the flange measuring element 41, measurement of the six variables is possible, and it is possible to increase the accuracy of measuring the six variables.

After the first robot 1 has been measured by the fixed camera 3, the flange 11 of the first robot 1 is put at a location at which the first robot 1 does not interfere with the second robot 2.

Second Robot 2

Figure 6:
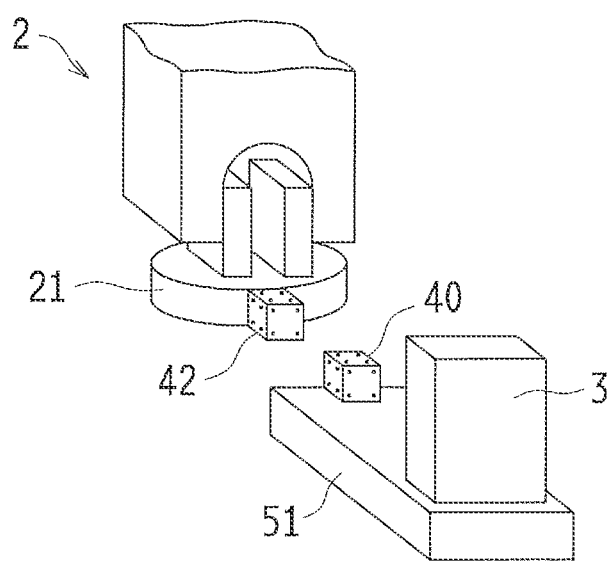
FIG. 6 is a view that schematically shows a state where a measuring element on a flange of the second robot and the reference measuring element are measured by the fixed camera.

Next, by actuating the second robot 2 to move the flange 21 of the second robot 2, the flange 21 of the second robot 2 is placed near the reference measuring element 40 as shown in the schematic view of FIG. 6, and one side of the flange measuring element 42 attached to the flange 21 is faced toward the fixed camera 3 (step ST103 of FIG. 4). In this state, the four measuring points 4a of the reference measuring element 40 and the four measuring points 4a of the flange measuring element 42 are measured by driving the fixed camera 3 (step ST104 of FIG. 4).

By measuring the four measuring points 4a of the reference measuring element 40 and the four measuring points 4a of the flange measuring element 42 with the fixed camera 3 in this way, a position and attitude relation (a relation in the position in the X axis, the position in the Y axis and the position in the Z axis and a relation in the attitude around the X axis, the attitude around the Y axis and the attitude around the Z axis) between the reference measuring element 40 and the flange measuring element 42 is obtained from the camera measured data. Calculation for obtaining the position and attitude relation between the reference measuring element 40 and the flange measuring element 42 from the camera measured data is executed in the computation unit 113.

Calculation of Position and Attitude and Calculation of Error

Next, a process of calculating a position and attitude and a process of calculating an error, which are executed by the computation unit 113 of the controller 100 in the present embodiment, will be described with reference to FIG. 7.

First Robot 1

In the following description, a coordinate system of which the origin is a reference point of the base 1a of the first robot 1 is referred to as RB1 coordinate system. A coordinate system of the flange measuring element 41 provided on the first robot 1 is referred to as FC1 coordinate system.

Figure 7:
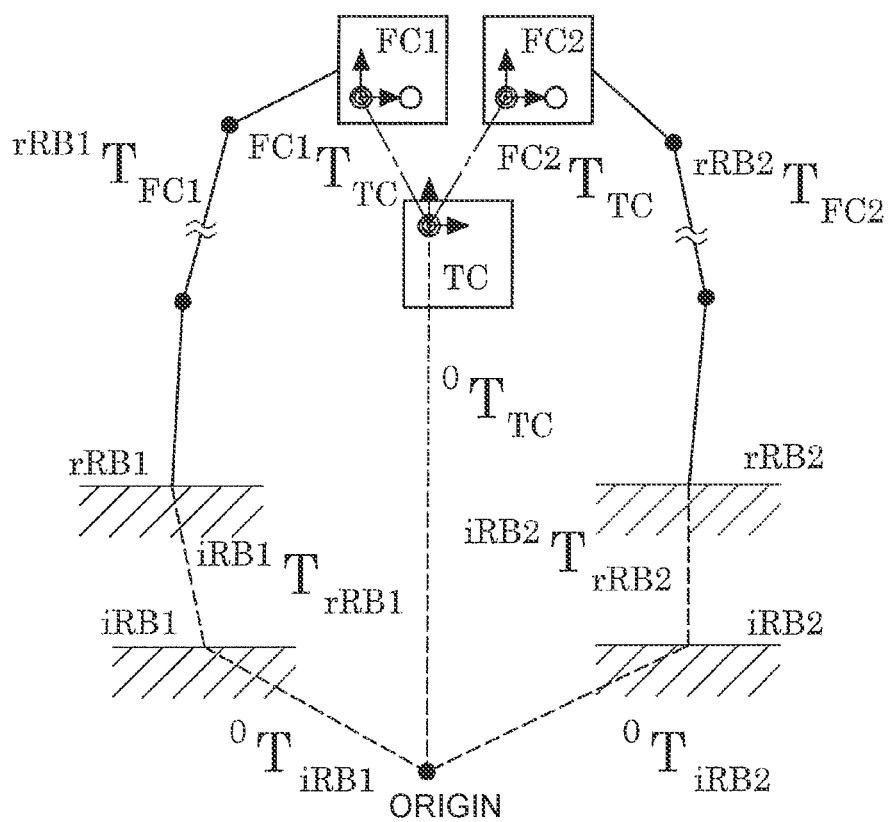
FIG. 7 is a view that schematically shows the relation among coordinate systems of a virtual origin, the first robot, second robot, flange measuring elements, and reference measuring element.

Initially, in FIG. 7, a design installation position and attitude of the first robot 1 when viewed from a coordinate system of a virtual origin [0] is denoted by $^0T_{iRB1}$. An actual installation position and attitude of the first robot 1 when viewed from a design RB1 coordinate system is denoted by $^{iRB1}T_{rRB1}$. The $^{iRB1}T_{rRB1}$ is an error between the design installation position and attitude of the first robot 1 and the actual installation position and attitude of the first robot 1, and is not known. A position and attitude of the flange measuring element 41 when viewed from the actual RB1 coordinate system is denoted by $^{rRB1}T_{FC1}$. A position and attitude of the reference measuring element 40 when viewed from the FC1 coordinate system is denoted by $^{FC1}T_{TC}$.

On the other hand, a position and attitude of the reference measuring element 40 when viewed from the coordinate system of the virtual origin [0] is denoted by $^0T_{TC}$.

The above $^0T_{iRB1}$, $^{iRB1}T_{rRB1}$, $^{rRB1}T_{FC1}$, $^{FC1}T_{TC}$ and $^0T_{TC}$ hold a relation expressed by the following mathematical expression (1).

$$^0T_{iRB1}{}^{iRB1}T_{rRB1}{}^{rRB1}T_{FC1}{}^{FC1}T_{TC}=^0T_{TC} \quad (1)$$

From the mathematical expression (1), the unknown $^{iRB1}T_{rRB1}$ is expressed by the following mathematical expression.

$$^{iRB1}T_{rRB1}=^0T_{iRB1}{}^{-1}\,^0T_{TC}(^{rRB1}T_{FC1}{}^{FC1}T_{TC})^{-1} \quad (2)$$

From the mathematical expression (2), the error $^{iRB1}T_{rRB1}$ between the design installation position and attitude of the first robot 1 and the actual installation position and attitude of the first robot 1 (hereinafter, also referred to as the error $^{iRB1}T_{rRB1}$ of the first robot 1) is calculated.

$^0T_{iRB1}$ is a design normal size value (for example, normal size data of computer aided design (CAD) data), and is known.

$^{rRB1}T_{FC1}$ is a position and attitude of the flange measuring element 41 in the robot coordinate system (the robot coordinate system of which the origin is the reference point of the base 1a of the first robot 1) at the time when the flange measuring element 41 provided on the first robot 1 has been measured by the fixed camera 3. $^{rRB1}T_{FC1}$ is calculated from data of the six variables of the robot control unit 111 (data of the six variables of the representative point of the flange 11 of the first robot 1) and the position and attitude relation (known) between the representative point of the flange 11 of the first robot 1 and the flange measuring element 41.

$^{FC1}T_{TC}$ is calculated from a position and attitude relation between the reference measuring element 40 and the flange measuring element 41, which is calculated from the camera measured data. $^0T_{TC}$ is a design normal size value (for example, normal size data of CAD data) and is known.

The computation unit 113 calculates the error $^{iRB1}T_{rRB1}$ of the first robot 1 from the mathematical expression (2), and stores the calculated error $^{iRB1}T_{rRB1}$ of the first robot 1 in the RAM 130.

In addition, the computation unit 113 calculates the actual installation position and attitude of the first robot 1 by using the error $^{iRB1}T_{rRB1}$ of the first robot 1, calculated as described above, as a correction amount (step ST105 of FIG. 4). By executing such calculation, the actual installation position and attitude of the representative point of the flange 11 of the first robot 1 is adjusted to the design installation position and attitude.

Second Robot 2

In the following description, a coordinate system of which the origin is a reference point of the base 2a of the second robot 2 is referred to as RB2 coordinate system. A coordinate system of the flange measuring element 42 provided on the second robot 2 is referred to as FC2 coordinate system.

Initially, in FIG. 7, a design installation position and attitude of the second robot 2 when viewed from the coordinate system of the virtual origin [0] is denoted by $^0T_{iRB2}$. An actual installation position and attitude of the second robot 2 when viewed from the design RB2 coordinate system is denoted by $^{iRB2}T_{rRB2}$. The $^{iRB2}T_{rRB2}$ is an error between the design installation position and attitude of the second robot 2 and the actual installation position and attitude of the second robot 2, and is not known. A position and attitude of the flange measuring element 42 when viewed from the actual RB2 coordinate system is denoted by $^{rRB2}T_{FC2}$. A position and attitude of the reference measuring element 40 when viewed from the FC2 coordinate system is denoted by $^{FC2}T_{TC}$.

On the other hand, the position and attitude of the reference measuring element 40 when viewed from the coordinate system of the virtual origin [0] is denoted by $^0T_{TC}$.

The above $^0T_{iRB2}$, $^{iRB2}T_{rRB2}$, $^{rRB2}T_{FC2}$, $^{FC2}T_{TC}$ and $^0T_{TC}$ hold a relation expressed by the following mathematical expression (3).

$$^0T_{iRB2}\,^{iRB2}T_{rRB2}\,^{rRB2}T_{FC2}\,^{FC2}T_{TC} = {}^0T_{TC} \qquad (3)$$

From the mathematical expression (3), the unknown $^{iRB2}T_{rRB2}$ is expressed by the following mathematical expression.

$$^{iRB2}T_{rRB2} = {}^0T_{iRB2}^{-1}\,^0T_{TC}({}^{rRB2}T_{FC2}\,^{FC2}T_{TC})^{-1} \qquad (4)$$

From the mathematical expression (4), the error $^{iRB2}T_{rRB2}$ between the design installation position and attitude of the second robot 2 and the actual installation position and attitude of the second robot 2 (hereinafter, also referred to as the error $^{iRB2}T_{rRB2}$ of the second robot 2) is calculated.

$^0T_{iRB2}$ is a design normal size value (for example, normal size data of CAD data) and is known.

$^{rRB2}T_{FC2}$ is a position and attitude of the flange measuring element 42 provided on the second robot 2 in a robot coordinate system (the robot coordinate system of which the origin is the reference point of the base 2a of the second robot 2) at the time when the flange measuring element 42 has been measured by the fixed camera 3. $^{rRB2}T_{FC2}$ is calculated from data of the six variables of the robot control unit 111 (data of the six variables of the representative point of the flange 21 of the second robot 2) and the position and attitude relation (known) between the representative point of the flange 21 of the second robot 2 and the flange measuring element 42.

$^{FC2}T_{TC}$ is calculated from a position and attitude relation between the reference measuring element 40 and the flange measuring element 42, which is calculated from the camera measured data. $^0T_{TC}$ is a design normal size value (for example, normal size data of CAD data) and is known.

The computation unit 113 calculates the error $^{iRB2}T_{rRB2}$ of the second robot 2 from the mathematical expression (4), and stores the calculated error $^{iRB2}T_{rRB2}$ of the second robot 2 in the RAM 130.

In addition, the computation unit 113 calculates the actual installation position and attitude of the flange 21 of the second robot 2 by using the error $^{iRB2}T_{rRB2}$ of the second robot 2, calculated as described above, as a correction amount (step ST105 of FIG. 4). By executing such calculation, the actual installation position and attitude of the representative point of the flange 21 of the second robot 2 is adjusted to the design installation position and attitude.

Cooperative Working

In the above-described calculation for the first robot 1 and calculation for the second robot 2, each of the robot errors is calculated by measuring the same reference measuring element 40 installed in the process S, so the position and attitude ($^0T_{TC}$) of the reference measuring element 40 when viewed from the coordinate system of the virtual origin [0] is the same. Thus, the left-hand side of the mathematical expression (1) is equal to the left-hand side of the mathematical expression (3), so a relation expressed by the following mathematical expression (5) holds.

$$^0T_{iRB1}\,^{iRB1}T_{rRB1}\,^{rRB1}T_{FC1}\,^{FC1}T_{TC} = {}^0T_{iRB2}\,^{iRB2}T_{rRB2}$$

$$^{rRB2}T_{FC2}\,^{FC2}T_{TC} \qquad (5)$$

From the mathematical expression (5), a relation between $^{rRB1}T_{FC1}$ and $^{rRB2}T_{FC2}$ is expressed by the following mathematical expression (6).

$$^{rRB1}T_{FC1} = ({}^0T_{iRB1}\,^{iRB1}T_{rRB1})^{-1}$$

$$({}^0T_{iRB2}\,^{iRB2}T_{rRB2}\,^{rRB2}T_{FC2}\,^{FC2}T_{TC})^{FC1}T_{TC}^{-1} \qquad (6)$$

In this way, since $^{rRB1}T_{FC1}$ and $^{rRB2}T_{FC2}$ each are expressed by using the other one, it is possible to bring the coordinate system of the first robot 1 and the coordinate system of the second robot 2 into coincidence with each other in a virtual space by calibrating an installation position and attitude relation between the first robot 1 and the second robot 2 based on the relation between $^{rRB1}T_{FC1}$ and $^{rRB2}T_{FC2}$. Thus, for example, when working data or measured data for moving the representative point of the flange 21 of the second robot 2 is issued to the controller 100, the first robot 1 is actuated in cooperation with the motion of the second robot 2. Therefore, as for the first robot 1, it is not required to set working data or measured data, so it is possible to improve working efficiency in the process S of working equipment.

Advantageous Effects

As described above, according to the present embodiment, the flange measuring elements 41, 42 respectively provided on the first and second robots 1, 2 installed in the process S of working equipment and the reference measuring element 40 are measured by the fixed camera 3, and the error $^{iRB1}T_{rRB1}$ of the first robot 1 and the error $^{iRB2}T_{rRB2}$ of the second robot 2 are calculated in the controller 100 by using the camera measured data, so it is possible to calibrate the first robot 1 and the second robot 2 on-line. Thus, in comparison with the case where two robots are individually calibrated, a time that is required for calibration is shortened, so it is possible to shorten the overall calibration time of the process S of working equipment.

Moreover, in the present embodiment, it is possible to bring the coordinate system of the first robot 1 installed in the process S of working equipment and the coordinate system of the second robot 2 installed in the process S of working equipment into coincidence with each other in a virtual space, so cooperative working between the first robot 1 and the second robot 2 is possible.

Robot Camera Calibration

In this embodiment, a position and attitude error of a camera tool point of the robot camera 22 attached to the flange 21 of the second robot 2 is calculated. The details will be described with reference to FIG. 1 and FIG. 8 to FIG. 10. The camera tool point of the robot camera 22 is an example of a measuring tool point of a robot hand measuring device of a specified one of the robots according to the aspect of the disclosure.

Robot Operation and Measurement During Calibration

Figure 8:
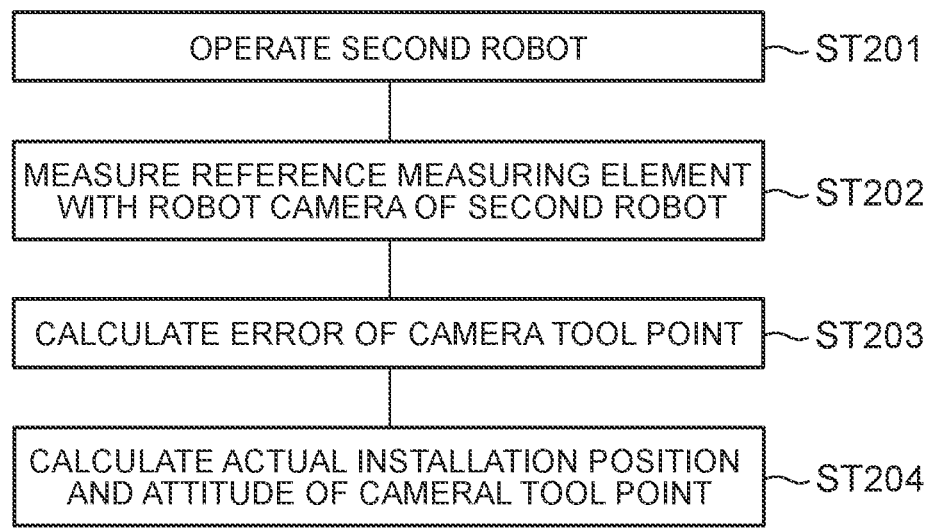
FIG. 8 is a flowchart that shows the process details of calibration of a robot camera.
Figure 9:
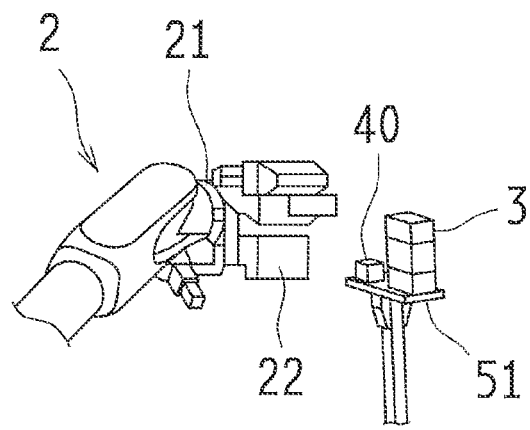
FIG. 9 is a view that schematically shows a state where the reference measuring element is measured by the robot camera of the second robot.

By actuating the second robot 2 to move the flange 21 of the second robot 2, the flange 21 of the second robot 2 is placed near the reference measuring element 40 as shown in the schematic view of FIG. 9, and the robot camera 22 attached to the flange 21 is faced toward the reference measuring element 40 (step ST201 of FIG. 8). In this state, the four measuring points 4a of the reference measuring element 40 are measured by driving the robot camera 22 (step ST202 of FIG. 8).

By measuring the four measuring points 4a of the reference measuring element 40 with the robot camera 22 in this way, a position and attitude relation (a relation in the position in the X axis, the position in the Y axis and the position in the Z axis and a relation in the attitude around the X axis, the attitude around the Y axis and the attitude around the Z axis) between the camera tool point of the robot camera 22 and the reference measuring element 40 is obtained from the camera measured data. Calculation for obtaining the position and attitude relation between the camera tool point of the robot camera 22 and the reference measuring element 40 from the camera measured data is executed in the computation unit 113.

Calculation of Position and Attitude and Calculation of Error

Next, a process of calculating a position and attitude and a process of calculating an error, which are executed by the computation unit 113 of the controller 100 in the present embodiment, will be described with reference to FIG. 10.

In the following description, a coordinate system of which the origin is the reference point of the base 2a of the second robot 2 is referred to as RB2 coordinate system, and a coordinate system of which the origin is the camera tool point of the robot camera 22 attached to the flange 21 of the second robot 2 is referred to as camera coordinate system. A coordinate system of the reference measuring element 40 is referred to as TC coordinate system.

Figure 10:
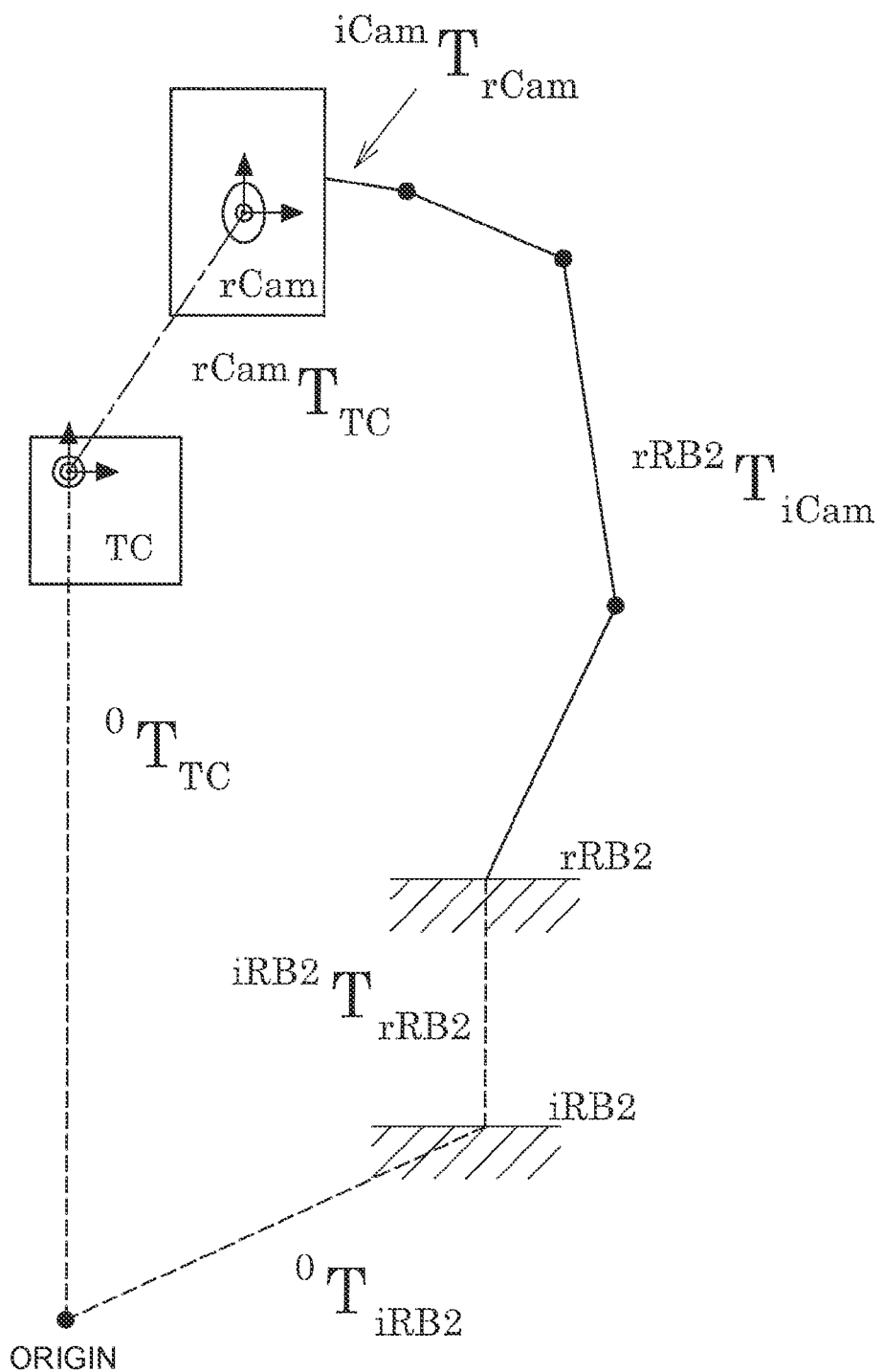
FIG. 10 is a view that schematically shows the relation among coordinate systems of a virtual origin, the second robot, a camera tool point of the robot camera and the reference measuring element.

In FIG. 10, a design installation position and attitude of the second robot 2 when viewed from the coordinate system of the virtual origin [0] is denoted by $^{0}T_{iRB2}$. An actual installation position and attitude of the second robot 2 when viewed from the design RB2 coordinate system is denoted by $^{iRB2}T_{rRB2}$.

A design installation position and attitude of the camera tool point of the robot camera 22 when viewed from the actual RB2 coordinate system is denoted by $^{rRB2}T_{iCam}$. An actual installation position and attitude of the camera tool point of the robot camera 22 when viewed from the design camera coordinate system is denoted by $^{iCam}T_{rCam}$. The $^{iCam}T_{rCam}$ is an error between the design installation position and attitude of the camera tool point of the robot camera 22 and the actual installation position and attitude of the camera tool point, and is not known. A position and attitude of the reference measuring element 40 when viewed from the actual camera coordinate system is $^{rCam}T_{TC}$.

On the other hand, the position and attitude of the reference measuring element 40 when viewed from the coordinate system of the virtual origin [0] is denoted by $^{0}T_{TC}$.

The above $^{0}T_{iRB2}$, $^{iRB2}T_{rRB2}$, $^{rRB2}T_{iCam}$, $^{iCam}T_{rCam}$, $^{rCam}T_{TC}$ and $^{0}T_{TC}$ hold a relation expressed by the following mathematical expression (7).

$$^{0}T_{iRB2}{}^{iRB2}T_{rRB2}{}^{rRB2}T_{iCam}{}^{iCam}T_{rCam}{}^{rCam}T_{TC}={}^{0}T_{TC} \quad (7)$$

From the mathematical expression (7), the unknown $^{iCam}T_{rCam}$ is expressed by the following mathematical expression.

$$^{iCam}T_{rCam}=({}^{0}T_{iRB2}{}^{iRB2}T_{rRB2}{}^{rRB2}T_{iCam})^{-1}\ {}^{0}T_{TC}{}^{rCam}T_{TC}{}^{-1} \quad (8)$$

From the mathematical expression (8), the error $^{iCam}T_{rCam}$ between the design installation position and attitude of the camera tool point of the robot camera 22 attached to the flange 21 of the second robot 2 and the actual installation position and attitude of the camera tool point (hereinafter, also referred to as the error $^{iCam}T_{rCam}$ of the robot camera 22) is calculated.

$^{0}T_{iRB2}$ is a design normal size value (for example, normal size data of CAD data) and is known.

$^{rRB2}T_{iCam}$ is a position and attitude of the design camera tool point of the robot camera 22 in the robot coordinate system (the robot coordinate system of which the origin is the reference point of the base 2a of the second robot 2) at the time when the reference measuring element 40 has been measured by the robot camera 22. $^{rRB2}T_{iCam}$ is calculated from data of the six variables of the robot control unit 111 (data of the six variables of the representative point of the flange 21 of the second robot 2) and the position and attitude relation (known) between the representative point of the flange 21 of the second robot 2 and the design camera tool point of the robot camera 22.

$^{rCam}T_{TC}$ is calculated from the position and attitude relation between the camera tool point of the robot camera 22 and the reference measuring element 40, which is calculated from the camera measured data. $^{0}T_{TC}$ is a design normal size value (for example, normal size data of CAD data) and is known. As for $^{iRB2}T_{rRB2}$, the calculated value calculated from the mathematical expression (4) in the robot calibration may be used.

The computation unit 113 calculates the error $^{iCam}T_{rCam}$ of the robot camera 22 from the mathematical expression (8) (step ST203 of FIG. 8). The calculated error $^{iCam}T_{rCam}$ of the robot camera 22 is stored in the RAM 130.

In addition, the computation unit 113 calculates the actual installation position and attitude of the camera tool point of the robot camera 22 by using the error $^{iCam}T_{rCam}$ of the robot camera 22, calculated as described above, as a correction amount (step ST204 of FIG. 8). By executing such calculation, the actual installation position and attitude of the camera tool point of the robot camera 22 is adjusted to the design installation position and attitude.

According to the embodiment, the error $^{iCam}T_{rCam}$ of the robot camera 22 is calculated by using the camera measured data of the reference measuring element 40, measured by the robot camera 22 attached to the flange 21 of the second robot 2, the data of the six variables of the robot control unit 111 and the error $^{iRB2}T_{rRB2}$ of the second robot 2, calculated in the robot calibration, so it is possible to easily calibrate the installation position and attitude of the robot camera 22 of the second robot 2 in a short time.

Nut Runner Calibration

In this embodiment, a position and attitude error of a nut runner tool point of the nut runner 23 attached to the flange 21 of the second robot 2 is calculated. The details will be described with reference to FIG. 1 and FIG. 11 to FIG. 13. The nut runner tool point of the nut runner 23 is an example of a working tool point of a working tool of a specified one of robots according to the aspect of the disclosure.

Robot Operation and Measurement During Nut Runner Calibration

Figure 11:
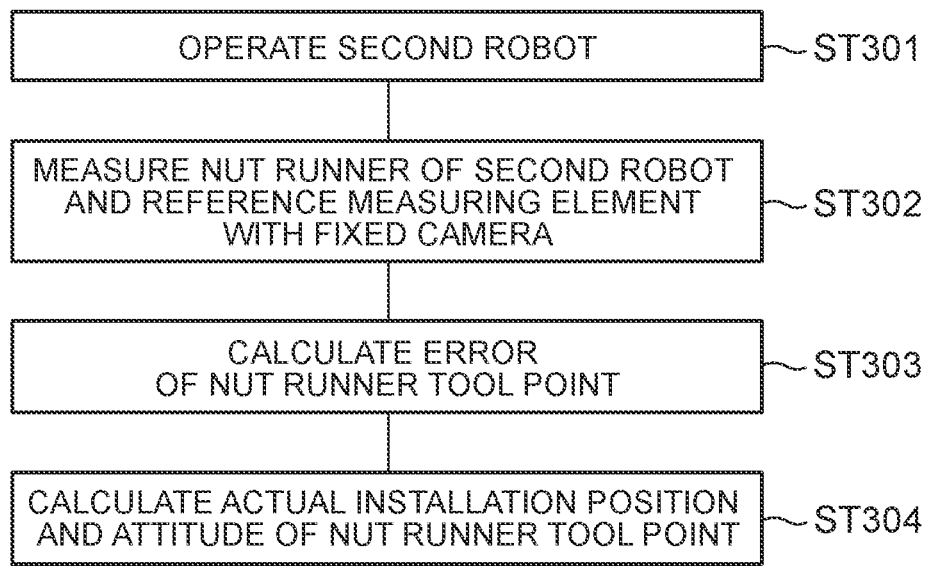
FIG. 11 is a flowchart that shows the process details of calibration of a nut runner.
Figure 12:
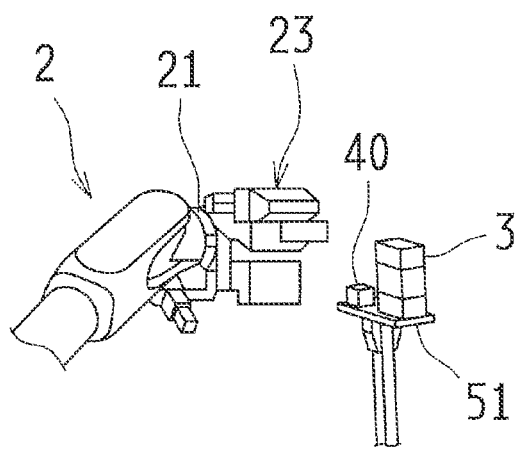
FIG. 12 is a view that schematically shows a state where the nut runner of the second robot is measured by the fixed camera.

By actuating the second robot 2 to move the flange 21 of the second robot 2, the flange 21 of the second robot 2 is placed near the reference measuring element 40 as shown in the schematic view of FIG. 12, and the nut runner 23 attached to the flange 21 is faced toward the fixed camera 3 (step ST301 of FIG. 11). In this state, the tip of the nut runner 23 and the reference measuring element 40 are measured by driving the fixed camera 3. Specifically, three points of which the position and attitude with respect to the nut runner tool point of the nut runner 23 (the central point of the tip of the nut runner 23) is known are measured by the fixed camera 3 (for example, three points that are not aligned in the same straight line from a ridge line of an edge of the tip of the nut runner 23 are measured), and the four measuring points 4a of the reference measuring element 40 are measured (step ST302 of FIG. 11).

By measuring the tip of the nut runner 23 and the four measuring points 4a of the reference measuring element 40 with the fixed camera 3 in this way, a position and attitude relation (a relation in the position in the X axis, the position in the Y axis and the position in the Z axis and a relation in the attitude around the X axis, the attitude around the Y axis and the attitude around the Z axis) between the tip of the nut runner 23 and the reference measuring element 40 is obtained from the camera measured data. Calculation for obtaining the position and attitude relation between the tip of the nut runner 23 and the reference measuring element 40 from the camera measured data is executed in the computation unit 113.

Alternatively, the measuring element 4 shown in FIG. 3 may be attached to the nut runner 23 in advance, and camera measured data (measured data of the six variables) may be obtained by measuring the four measuring points 4a of the measuring element 4 provided on the nut runner 23 and the four measuring points 4a of the reference measuring element 40 with the fixed camera 3.

Calculation of Position and Attitude and Calculation of Error

Next, a process of calculating a position and attitude and a process of calculating an error, which are executed by the computation unit 113 of the controller 100 in the present embodiment, will be described with reference to FIG. 13.

In the following description, a coordinate system of which the origin is the reference point of the base 2a of the second robot 2 is referred to as RB2 coordinate system, and a coordinate system of which the origin is the nut runner tool point of the nut runner 23 attached to the flange 21 of the second robot 2 is referred to as nut runner coordinate system. The coordinate system of the reference measuring element 40 is referred to as TC coordinate system.

Figure 13:
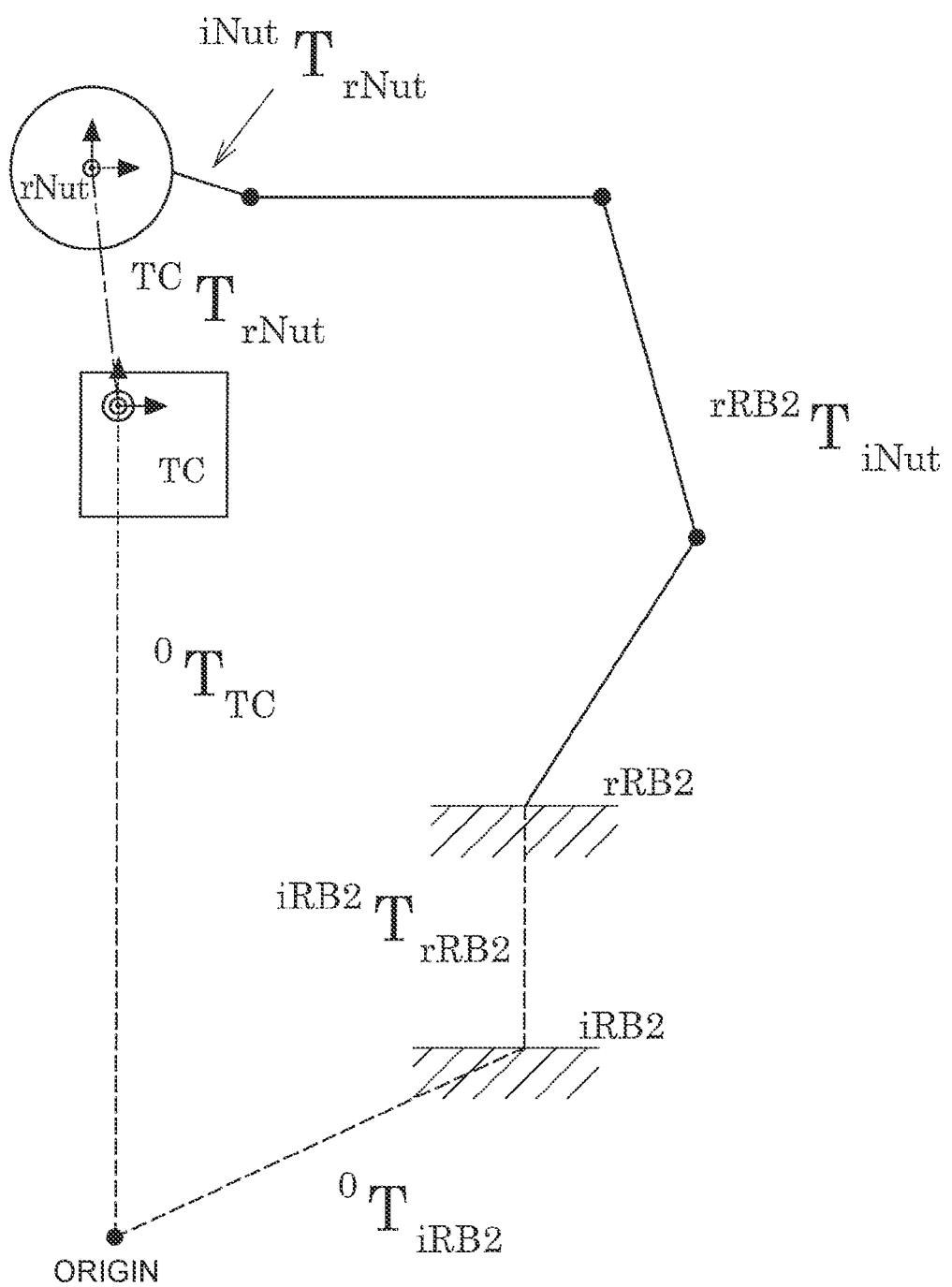
FIG. 13 is a view that schematically shows the relation among coordinate systems of a virtual origin, the second robot, nut runner tool point and reference measuring element.

In FIG. 13, a design installation position and attitude of the second robot 2 when viewed from the coordinate system of the virtual origin [0] is denoted by $^{0}T_{iRB2}$. An actual installation position and attitude of the second robot 2 when viewed from the design RB2 coordinate system is denoted by $^{iRB2}T_{rRB2}$. A design installation position and attitude of the nut runner tool point when viewed from the actual RB2 coordinate system is denoted by $^{rRB2}T_{iNut}$. An actual installation position and attitude of the nut runner tool point when viewed from the design nut runner coordinate system is denoted by $^{iNut}T_{rNut}$. The $^{iNut}T_{rNut}$ is an error between the design installation position and attitude of the nut runner tool point of the nut runner 23 and the actual installation position and attitude of the nut runner tool point, and is not known.

On the other hand, the position and attitude of the reference measuring element 40 when viewed from the coordinate system of the virtual origin [0] is denoted by $^{0}T_{TC}$. An actual installation position and attitude of the nut runner tool point of the nut runner 23 when viewed from the TC coordinate system is denoted by $^{TC}T_{rNut}$.

The above $^{0}T_{iRB2}$, $^{iRB2}T_{rRB2}$, $^{rRB2}T_{iNut}$, $^{iNut}T_{rNut}$, $^{0}T_{TC}$ and $^{TC}T_{rNut}$ hold a relation expressed by the following mathematical expression.

$$^{0}T_{iRB2}\,^{iRB2}T_{rRB2}\,^{rRB2}T_{iNut}\,^{iNut}T_{rNut} = {}^{0}T_{TC}\,^{TC}T_{rNut} \qquad (9)$$

From the mathematical expression (9), the unknown $^{iNut}T_{rNut}$ is expressed by the following mathematical expression.

$$^{iNut}T_{rNut} = ({}^{0}T_{iRB2}\,^{iRB2}T_{rRB2}\,^{rRB2}T_{iNut})^{-1}\,^{0}T_{TC}\,^{TC}T_{rNut} \qquad (10)$$

From the mathematical expression (10), the error $^{iNut}T_{rNut}$ between the design installation position and attitude of the nut runner tool point of the nut runner 23 attached to the flange 21 of the second robot 2 and the actual installation position and attitude of the nut runner tool point (hereinafter, also referred to as the error $^{iNut}T_{rNut}$ of the nut runner 23) is calculated.

$^{0}T_{iRB2}$ is a design normal size value (for example, normal size data of CAD data) and is known.

$^{rRB2}T_{iNut}$ is a position and attitude of the design nut runner tool point of the nut runner 23 in the robot coordinate system (the robot coordinate system of which the origin is the reference point of the base 2a of the second robot 2) at the time when the nut runner 23 has been measured by the fixed camera 3. $^{rRB2}T_{iNut}$ is calculated from data of the six variables of the robot control unit 111 (data of the six variables of the representative point of the flange 21 of the second robot 2) and the position and attitude relation (known) between the representative point of the flange 21 of the second robot 2 and the design nut runner tool point of the nut runner 23.

$^{TC}T_{rNut}$ is calculated from the position and attitude relation between the tip of the nut runner 23 and the reference measuring element 40, which is calculated from the camera measured data. $^{0}T_{TC}$ is a design normal size value (for example, normal size data of CAD data) and is known. As for $^{iRB2}T_{rRB2}$, the calculated value calculated from the mathematical expression (4) in the robot calibration may be used.

The computation unit 113 calculates the error $^{iNut}T_{rNut}$ of the nut runner 23 from the mathematical expression (10) (step ST303 of FIG. 11). The calculated error $^{iNut}T_{rNut}$ of the nut runner 23 is stored in the RAM 130.

In addition, the computation unit 113 calculates the actual installation position and attitude of the nut runner tool point of the nut runner 23 by using the error $^{iNut}T_{rNut}$ of the nut runner 23, calculated as described above, as a correction amount (step ST304 of FIG. 11). By executing such calculation, the actual installation position and attitude of the nut runner tool point of the nut runner 23 is adjusted to the design installation position and attitude.

According to the embodiment, the error $^{iNut}T_{rNut}$ of the nut runner 23 is calculated by using the camera measured data of the tip of the nut runner 23 attached to the flange 21 of the second robot 2, measured by the fixed camera 3, the data of the six variables of the robot control unit 111 and the error $^{iRB2}T_{rRB2}$ of the second robot 2, calculated in the robot calibration, so it is possible to easily calibrate the installation position and attitude of the nut runner 23 of the second robot 2 in a short time.

Material Hand Calibration

Figure 15:
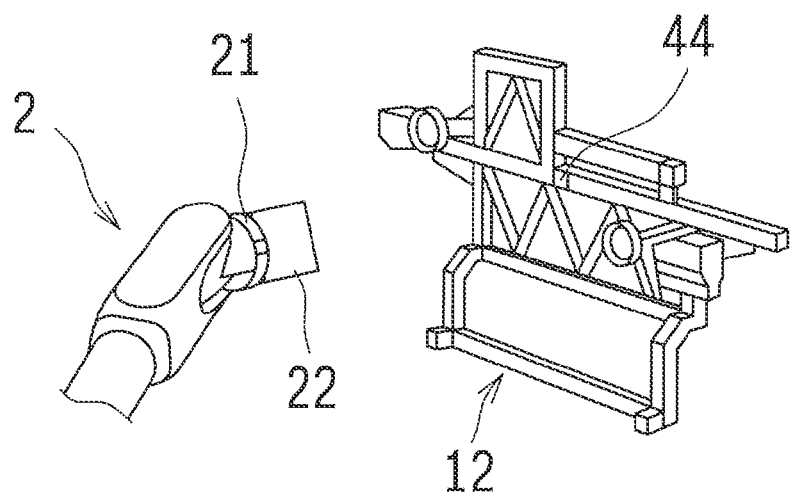
FIG. 15 is a view that schematically shows a state where a material hand measuring element of the first robot is measured by the robot camera of the second robot.

As shown in FIG. 1 and FIG. 15, the measuring element 4 shown in FIG. 3 is attached to the material hand 12. Hereinafter, the measuring element 4 attached to the material hand 12 is referred to as material hand measuring element 44. The material hand measuring element 44 is positioned relatively with respect to the material hand 12. A position and attitude relation between a material hand tool point of the material hand 12 and the four measuring points 4a on each side of the material hand measuring element 44 is known. The material hand tool point of the material hand 12 is an example of a working tool point of another one of robots according to the aspect of the disclosure.

In the embodiment, a position and attitude error of the material hand tool point of the material hand 12 attached to the flange 11 of the first robot 1 is calculated. The details will be described with reference to FIG. 1 and FIG. 14 to FIG. 16.

Robot Operation and Measurement During Material Hand Calibration

Figure 14:
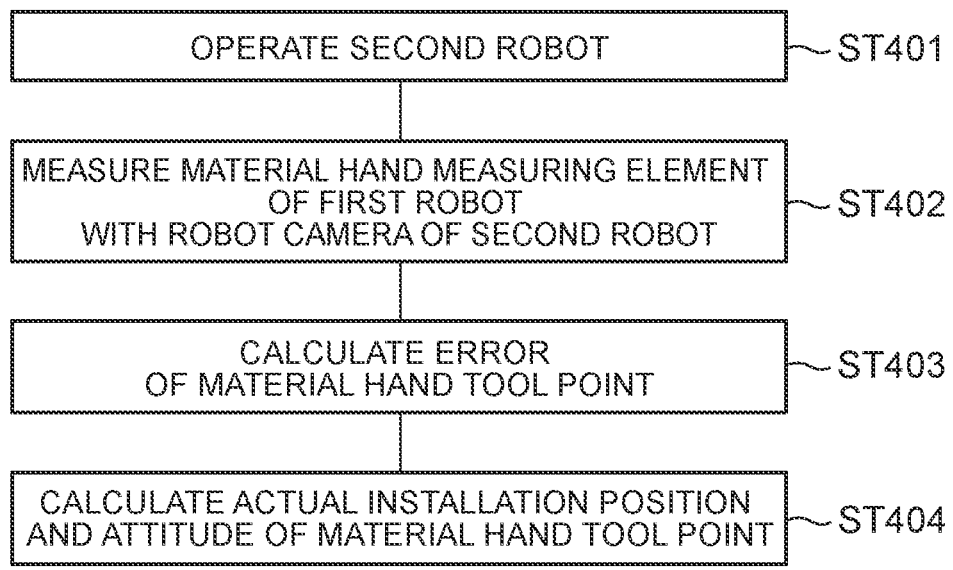
FIG. 14 is a flowchart that shows the process details of calibration of a material hand.

By actuating the second robot 2 to move the flange 21 of the second robot 2, the robot camera 22 of the second robot 2 is placed so as to face the material hand 12 of the first robot 1 as shown in the schematic view of FIG. 15 (step ST401 of FIG. 14). In this state, the four measuring points 4a of the material hand measuring element 44 are measured by driving the robot camera 22 (step ST402 of FIG. 14).

By measuring the four measuring points 4a of the material hand measuring element 44 with the robot camera 22 in this way, a position and attitude relation (a relation in the position in the X axis, the position in the Y axis and the position in the Z axis and a relation in the attitude around the X axis, the attitude around the Y axis and the attitude around the Z axis) between the camera tool point of the robot camera 22 and the material hand measuring element 44 is obtained from the camera measured data. Calculation for obtaining the position and attitude relation between the camera tool point of the robot camera 22 and the material hand measuring element 44 from the camera measured data is executed in the computation unit 113.

When the material hand measuring element 44 is not provided on the material hand 12, camera measured data (data of six variables) may be obtained by measuring specific points (three or more measuring points of which the position and attitude with respect to the material hand tool point is known) of the material hand 12 with the robot camera 22 of the second robot 2.

Calculation of Position and Attitude and Calculation of Error

Next, a process of calculating a position and attitude and a process of calculating an error, which are executed by the computation unit 113 of the controller 100 in the present embodiment, will be described with reference to FIG. 16.

In the following description, a coordinate system of which the origin is the reference point of the base 1a of the first robot 1 is referred to as RB1 coordinate system, and a coordinate system of which the origin is the reference point of the base 2a of the second robot 2 is referred to as RB2 coordinate system. A coordinate system of which the origin is the material hand tool point of the material hand 12 attached to the flange 11 of the first robot 1 is referred to as material hand coordinate system, and a coordinate system of which the origin is the camera tool point of the robot camera 22 attached to the flange 21 of the second robot 2 is referred to as camera coordinate system.

Figure 16:
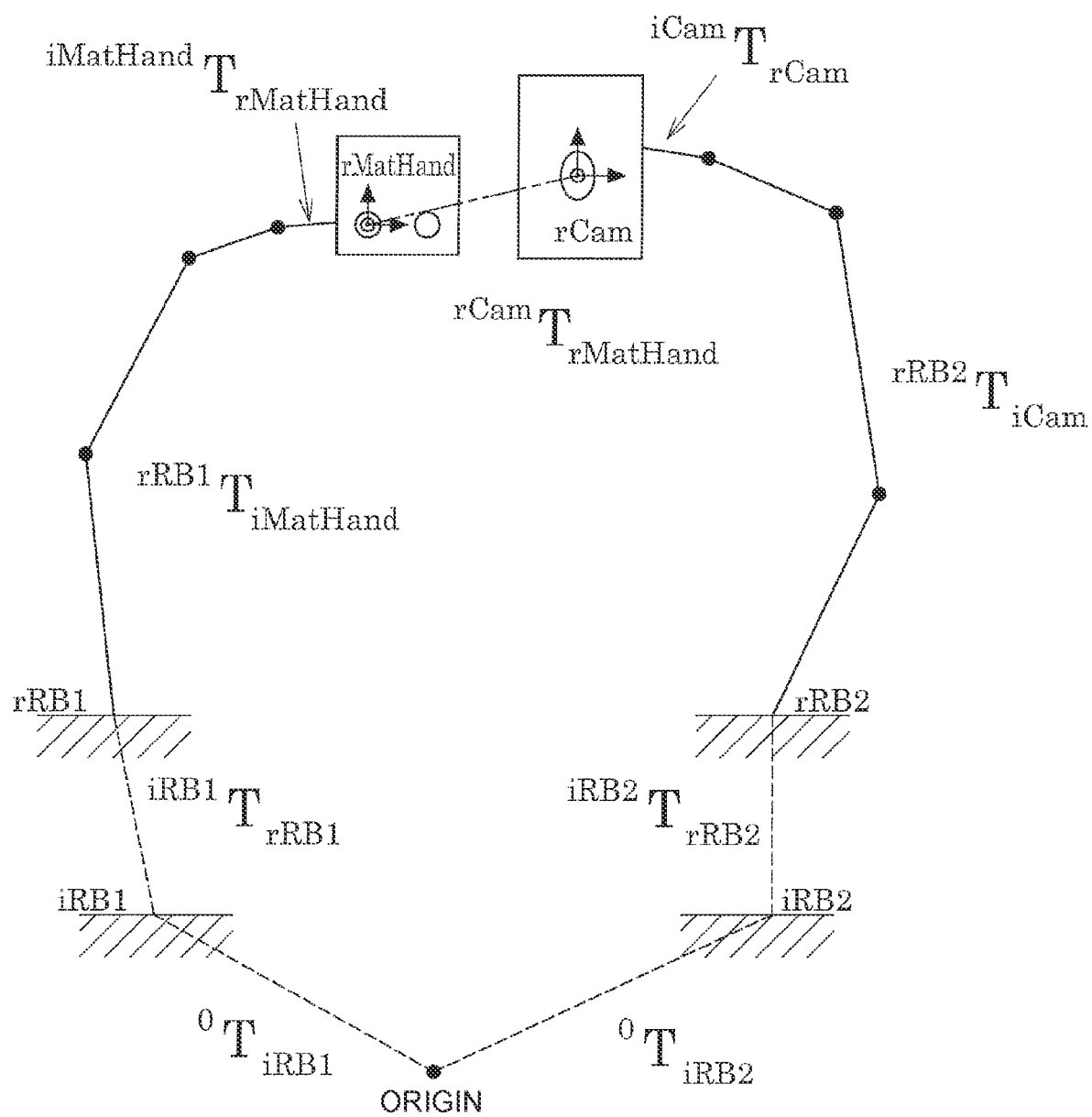
FIG. 16 is a view that schematically shows the relation among coordinate systems of a virtual origin, the first robot, second robot, camera tool point of the robot camera, and a material hand tool point.

Initially, in FIG. 16, a design installation position and attitude of the first robot 1 when viewed from the coordinate system of the virtual origin [0] is denoted by $^{0}T_{iRB1}$. An actual installation position and attitude of the first robot 1 when viewed from the design RB1 coordinate system is denoted by $^{iRB1}T_{rRB1}$. A design installation position and attitude of the material hand tool point of the material hand 12 when viewed from the actual RB1 coordinate system is denoted by $^{rRB1}T_{iMatHand}$. An actual installation position and attitude of the material hand tool point of the material hand 12 when viewed from the design material hand coordinate system is denoted by $^{iMatHand}T_{rMatHand}$. The $^{iMatHand}T_{rMatHand}$ is an error between the design rMatHand is installation position and attitude of the material hand tool point of the material hand 12 and the actual installation position and attitude of the material hand tool point, and is not known.

On the other hand, a design installation position and attitude of the second robot 2 when viewed from the coordinate system of the virtual origin [0] is denoted by $^{0}T_{iRB2}$. An actual installation position and attitude of the e second robot 2 when viewed from the design RB2 coordinate system is denoted by $^{iRB2}T_{rRB2}$. A design installation position and attitude of the robot camera 22 of the second robot 2 when viewed from the actual RB2 coordinate system is denoted by $^{rRB2}T_{iCam}$. An actual installation position and attitude of the camera tool point of the robot camera 22 when viewed from the design camera coordinate system is denoted by $^{iCam}T_{rCam}$. An actual installation position and attitude of the material hand tool point of the material hand 12 when viewed from the actual camera coordinate system is denoted by $^{rCam}T_{rMatHand}$.

The above $^{0}T_{iRB1}$, $^{iRB1}T_{rRB1}$, $^{rRB1}T_{iMatHand}$, $^{iMatHand}T_{rMatHand}$, $^{0}T_{iRB2}$, $^{iRB2}T_{rRB2}$, $^{rRB2}T_{iCam}$, $^{iCam}T_{rCam}$, and $^{rCam}T_{rMatHand}$ hold a relation expressed by the following mathematical expression (11).

$$^{0}T_{iRB1}\,^{iRB1}T_{rRB1}\,^{rRB1}T_{iMatHand}\,^{iMatHand}T_{rMatHand} =$$
$$^{0}T_{iRB2}\,^{iRB2}T_{rRB2}\,^{rRB2}T_{iCam}\,^{iCam}T_{rCam}$$
$$^{rCam}T_{rMatHand} \quad (11)$$

From the mathematical expression (11), the unknown $^{iMatHand}T_{rMatHand}$ is expressed by the following mathematical expression.

$$^{iMatHand}T_{rMatHand} = (^{0}T_{iRB1}\,^{iRB1}T_{rRB1}\,^{rRB1}T_{iMatHand})^{-1}$$
$$T_{iRB2}\,^{iRB2}T_{rRB2}\,^{rRB2}T_{iCam}\,^{iCam}T_{rCam}$$
$$^{rCam}T_{rMatHand} \quad (12)$$

From the mathematical expression (12), the error $^{iMatHand}T_{rMatHand}$ between the design installation position and attitude of the material hand tool point of the material hand 12 attached to the flange 11 of the first robot 1 and the actual installation position and attitude of the material hand tool point (hereinafter, also referred to as the error $^{iMatHand}T_{rMatHand}$ of the material hand 12) is calculated.

$^{0}T_{iRB1}$ and $^{0}T_{iRB2}$ are design normal size values (for example, normal size data of CAD data) and are known.

$^{rRB1}T_{iMatHand}$ is a position and attitude of the material hand measuring element 44 in the robot coordinate system (the robot coordinate system of which the origin is the reference point of the base 1a of the first robot 1). $^{rRB1}T_{iMatHand}$ is calculated from data of the six variables of the robot control unit 111 (data of the six variables of the representative point of the flange 11 of the first robot 1) and the position and attitude relation (known) between the representative point of the flange 11 of the first robot 1 and the material hand measuring element 44.

$^{rRB2}T_{iCam}$ is a position and attitude of the design camera tool point of the robot camera 22 in the robot coordinate system (the robot coordinate system of which the origin is the reference point of the base 2a of the second robot 2) at the time when the material hand measuring element 44 has been measured by the robot camera 22. $^{rRB2}T_{iCam}$ is calculated from data of the six variables of the robot control unit 111 (data of the six variables of the representative point of the flange 21 of the second robot 2) and the position and attitude relation (known) between the representative point of the flange 21 of the second robot 2 and the design camera tool point of the robot camera 22.

$^{rCam}T_{rMatHand}$ is calculated from the position and attitude relation between the camera tool point of the robot camera 22 and the material hand measuring element 44, which is measured from the camera measured data.

As for $^{iRB1}T_{rRB1}$, the calculated value calculated from the mathematical expression (2) in the robot calibration may be used. As for $^{iRB2}T_{rRB2}$, the calculated value calculated from the mathematical expression (4) in the robot calibration may be used. As for $^{iCam}T_{rCam}$, the calculated value calculated from the mathematical expression (8) in the robot camera calibration may be used.

The computation unit 113 calculates the error $^{iMatHand}T_{rMatHand}$ of the material hand 12 from the mathematical expression (12) (step ST403 of FIG. 14). The calculated error $^{iMatHand}T_{rMatHand}$ of the material hand 12 is stored in the RAM 130.

In addition, the computation unit 113 calculates the actual installation position and attitude of the material hand tool point of the material hand 12 by using the error $^{iMatHand}T_{rMatHand}$ of the material hand 12, calculated as described above, as a correction amount (step ST404 of FIG. 14). By executing such calculation, the actual installation position and attitude of the material hand tool point of the material hand 12 is adjusted to the design installation position and attitude.

According to the embodiment, the error $^{iMatHand}T_{rMatHand}$ of the material hand 12 is calculated by using the camera measured data of the material hand 12 of the first robot 1, measured by the robot camera 22 of the second robot 2, the data of the six variables of the robot control unit 111, the error $^{iRB1}T_{rRB1}$ of the first robot 1, calculated in the robot calibration, and the error $^{iRB2}T_{rRB2}$ of the second robot 2, calculated in the robot calibration, so it is possible to easily calibrate the installation position and attitude of the material hand 12 of the first robot 1 in a short time.

Alternative Embodiments

The embodiment described above is illustrative and not restrictive in all respects. Therefore, the technical scope of the disclosure should not be interpreted from only the above-described embodiment but be defined based on the appended claims. The technical scope of the disclosure encompasses the appended claims, equivalents thereof and all the modifications within the scope of the disclosure.

For example, in the above-described embodiment, the nut runner is attached to the flange 21 of the second robot 2; however, the working tool attached to the flange 21 is not limited to the nut runner. For example, another working tool, such as a welding tool and a screw tightening tool, may be attached to the flange 21 of the second robot 2. Another working tool other than the material hand 12 may be attached to the first robot 1.

In the above-described embodiment, the example in which the disclosure is applied to calibration of two robots installed in a process is described; however, the disclosure is not limited to this embodiment. The disclosure is also applicable to calibration of three or more robots installed in a process.

In this case, by executing the above-described robot calibration over the three or more robots, it is possible to calibrate three or more robots on-line. Thus, it is possible to shorten a time that is required for calibration. In addition, by executing a similar calculation process to the mathematical expression (6) for the three or more robots, it is possible to bring the coordinate systems of all the robots into coincidence with one another in a virtual space. Thus, it is possible to actuate the other robots in cooperation with the motion of a specified one of the robots.

The disclosure is effectively usable in a calibration system that calibrates a plurality of robots installed in a process.

What is claimed is:

1. A calibration system that calibrates a plurality of robots installed in a process, the calibration system comprising:
   a reference measuring element installed in the process, the reference measuring element having three or more first measuring points that are not aligned in a straight line, a distance between any two of the three or more first measuring points being predetermined;
   a flange measuring element attached to a flange provided at an arm tip of each of the robots, the flange measuring element having three or more second measuring points that are not aligned in a straight line, a distance between any two of the three or more second measuring points being predetermined;
   a fixed measuring device installed in the process, the fixed measuring device being configured to measure the flange measuring element of each of the robots and the reference measuring element; and
   a controller configured to
      control the robots,
      calculate a position and attitude relation between the flange measuring element of each robot and the reference measuring element based on a measured result measured by the fixed measuring device, and
      calculate an error between a design installation position and attitude of each robot and an actual installation position and attitude of each robot by using a calculation result of the position and attitude relation between the flange measuring element of each robot and the reference measuring element and position and attitude data of the flange measuring element of each robot in a robot coordinate system at a time when the robot has been measured by the fixed measuring device.

2. The calibration system according to claim 1, wherein the controller is configured to calculate the actual installation position and attitude of each robot by using the error between the design installation position and attitude of the robot and the actual installation position and attitude of the robot as a correction amount.

3. The calibration system according to claim 1, further comprising a robot hand measuring device attached to the flange of a specified one of the robots, the robot hand measuring device of the specified one of the robots being configured to measure the reference measuring element, wherein:
   the controller is configured to calculate a position and attitude relation between a measuring tool point of the robot hand measuring device and the reference measuring element based on a measured result measured by the robot hand measuring device of the specified one of the robots; and
   the controller is configured to calculate an error between a design installation position and attitude of the measuring tool point of the robot hand measuring device of the specified one of the robots and an actual installation position and attitude of the measuring tool point by using a calculation result of the position and attitude relation between the measuring tool point of the robot hand measuring device and the reference measuring element, position and attitude data of the measuring tool point of the robot hand measuring device in the robot coordinate system at a time when measurement has been performed by the robot hand measuring device, and the error between the design installation position and attitude of the specified one of the robots and the actual installation position and attitude of the specified one of the robots.

4. The calibration system according to claim 3, wherein the controller is configured to calculate the actual installation position and attitude of the measuring tool point of the robot hand measuring device by using the error between the design installation position and attitude of the measuring tool point of the robot hand measuring device of the specified one of the robots and the actual installation position and attitude of the measuring tool point as a correction amount.

5. The calibration system according to claim 1, further comprising a working tool attached to the flange of a specified one of the robots, wherein:
   the fixed measuring device is configured to measure the working tool of the specified one of the robots and the reference measuring element;
   the controller is configured to calculate a position and attitude relation between a working tool point of the working tool of the specified one of the robots and the reference measuring element based on a measured result measured by the fixed measuring device; and
   the controller is configured to calculate an error between a design installation position and attitude of the working tool point of the working tool of the specified one of the robots and an actual installation position and attitude of the working tool point by using a calculation result of the position and attitude relation between the working tool point of the working tool of the specified one of the robots and the reference measuring element, position and attitude data of the design working tool point of the working tool in the robot coordinate system at a time when measurement has been performed by the fixed measuring device, and the error between the design installation position and attitude of the specified one of the robots and the actual installation position and attitude of the specified one of the robots.

6. The calibration system according to claim 5, wherein the controller is configured to calculate the actual installation position and attitude of the working tool point of the working tool of the specified one of the robots by using the error between the design installation position and attitude of the working tool point of the working tool of the specified one of the robots and the actual installation position and attitude of the working tool point as a correction amount.

7. The calibration system according to claim 1, further comprising:
   a robot hand measuring device attached to the flange of a specified one of the robots; and
   a working tool attached to the flange of another one of the robots, other than the specified one of the robots, wherein:
   the robot hand measuring device of the specified one of the robots is configured to measure the working tool of the another one of the robots;
   the controller is configured to calculate a position and attitude relation between a measuring tool point of the robot hand measuring device and a working tool point of the working tool of the another one of the robots based on a measured result measured by the robot hand measuring device of the specified one of the robots; and
   the controller is configured to calculate an error between a design installation position and attitude of the working tool point of the working tool of the another one of the robots and an actual installation position and attitude of the working tool point by using a calculation result of the position and attitude relation between the measuring tool point of the robot hand measuring device and the working tool point of the working tool of the another one of the robots, position and attitude data of the measuring tool point of the robot hand measuring device in the robot coordinate system at a time when measurement has been performed by the robot hand measuring device, the error between the design installation position and attitude of the specified one of the robots and the actual installation position and attitude of the specified one of the robots, and the error between the design installation position and attitude of the another one of the robots and the actual installation position and attitude of the another one of the robots.

8. The calibration system according to claim 7, further comprising a working tool measuring element attached to the working tool of the another one of the robots, the working tool measuring element having three or more third measuring points that are not aligned in a straight line, a distance between any two of the three or more third measuring points being predetermined, a position and attitude relation between the working tool measuring element and the working tool point of the working tool of the another one of the robots being predetermined, wherein:
   the robot hand measuring device of the specified one of the robots is configured to measure the working tool measuring element attached to the working tool of the another one of the robots; and
   the controller is configured to calculate a position and attitude relation between a measuring tool point of the robot hand measuring device and a working tool point of the working tool of the another one of the robots based on a measured result measured by the robot hand measuring device of the specified one of the robots.

9. The calibration system according to claim 7, wherein the controller is configured to calculate the actual installation position and attitude of the working tool point of the working tool of the another one of the robots by using the error between the design installation position and attitude of the working tool point of the working tool of the another one of the robots and the actual installation position and attitude of the working tool point as a correction amount.

* * * * *

UNITED STATES PATENT AND TRADEMARK OFFICE
CERTIFICATE OF CORRECTION

PATENT NO. : 10,906,183 B2
APPLICATION NO. : 15/954092
DATED : February 2, 2021
INVENTOR(S) : Motoyasu Machino et al.

Page 1 of 1

It is certified that error appears in the above-identified patent and that said Letters Patent is hereby corrected as shown below:

In the Specification

In Column 18, Line(s) 20-24, equation 12, delete

"$$^{iMatHand}T_{rMatHand} = (^{0}T_{iRB1}{}^{iRB1}T_{rRB1}{}^{rRB1}T_{iMatHand})^{-10}$$

$$T_{iRB2}{}^{iRB2}T_{rRB2}{}^{rRB2}T_{iCam}{}^{iCam}T_{rCam}$$

$$^{rCam}T_{rMatHand} \quad (12)\text{''}$$

and insert -- $^{iMatHand}T_{rMatHand} = (^{0}T_{iRB1}{}^{iRB1}T_{rRB1}{}^{rRB1}T_{iMatHand})^{-1}$ $^{0}T_{iRB2}{}^{iRB2}T_{rRB2}{}^{rRB2}T_{iCam}{}^{iCam}T_{rCam}{}^{rCam}T_{rMatHand}$ ---(12) --, therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*